(12) United States Patent
Jepp

(10) Patent No.: US 10,883,644 B2
(45) Date of Patent: Jan. 5, 2021

(54) FILLING DEVICE FOR A PRESSURISED HEATING CIRCUIT

(71) Applicant: Christopher Jepp, Bexleyheath (GB)

(72) Inventor: Christopher Jepp, Bexleyheath (GB)

( * ) Notice: Subject to any disclaimer, the term of this patent is extended or adjusted under 35 U.S.C. 154(b) by 174 days.

(21) Appl. No.: 15/533,663

(22) PCT Filed: Dec. 7, 2015

(86) PCT No.: PCT/GB2015/053739
§ 371 (c)(1),
(2) Date: Jun. 7, 2017

(87) PCT Pub. No.: WO2016/092279
PCT Pub. Date: Jun. 16, 2016

(65) Prior Publication Data
US 2017/0343146 A1 Nov. 30, 2017

(30) Foreign Application Priority Data
Dec. 8, 2014 (GB) .................................. 1421737.6

(51) Int. Cl.
*F16L 55/105* (2006.01)
*F24D 3/10* (2006.01)
*F24D 19/08* (2006.01)

(52) U.S. Cl.
CPC .......... *F16L 55/105* (2013.01); *F24D 3/1083* (2013.01); *F24D 19/088* (2013.01); *F24D 2220/0271* (2013.01)

(58) Field of Classification Search
CPC ....... Y10T 137/86702; Y10T 137/8671; Y10T 137/2665; F16L 55/105; F24D 3/1083; F24D 19/088; F24D 2220/0271
(Continued)

(56) References Cited

U.S. PATENT DOCUMENTS 3,089,513 A * 5/1963 Kirk, Jr. ................ F24D 3/1008
137/505.34
3,768,518 A * 10/1973 Roth ....................... F16K 11/02
137/625.66
(Continued)

FOREIGN PATENT DOCUMENTS

GB 2204669 A 11/1988
GB 2450086 A 12/2008
(Continued)

OTHER PUBLICATIONS

International Search Report (ISR) relating to International Application No. PCT/GB2015/053739, dated May 10, 2016.
(Continued)

*Primary Examiner* — Jessica Cahill
(74) *Attorney, Agent, or Firm* — The Harris Firm

(57) ABSTRACT

A filling loop device for a pressurized heating system comprising means defining a fluid passage having, an inlet port connectable to a fluid supply and an outlet port connectable to a heating system fluid circuit; and a dead man valve interposed in the passage between the inlet port and the outlet port, said dead man valve biased to a normally closed condition to shut off fluid flow through the channel in either direction when unattended, and manually operable to an open condition to permit fluid to flow from the inlet port to the outlet port. Also provided is a method of charging a pressurized boiler and heating circuit.

7 Claims, 13 Drawing Sheets

(58) Field of Classification Search
USPC .................................................. 251/321, 325
See application file for complete search history.

(56) References Cited

U.S. PATENT DOCUMENTS

| | | | | |
|---|---|---|---|---|
| 4,004,610 | A * | 1/1977 | Theriot | F16K 17/00 |
| | | | | 137/107 |
| 4,193,553 | A * | 3/1980 | Kelly | B05B 1/3013 |
| | | | | 239/525 |
| 4,267,861 | A * | 5/1981 | Roth | F16K 3/267 |
| | | | | 137/625.48 |
| 2005/0121641 | A1 * | 6/2005 | Lim | A47K 13/00 |
| | | | | 251/321 |
| 2006/0124078 | A1 | 6/2006 | Merwin | |
| 2014/0197344 | A1 * | 7/2014 | Pelletier | F16K 21/04 |
| | | | | 251/321 |
| 2015/0240463 | A1 * | 8/2015 | Raule | F16K 17/048 |
| | | | | 137/14 |
| 2016/0195190 | A1 * | 7/2016 | Nguyen | F16K 3/246 |
| | | | | 251/285 |

FOREIGN PATENT DOCUMENTS

| | | | | |
|---|---|---|---|---|
| WO | WO9606308 | A1 | 2/1996 | |
| WO | WO9745680 | A1 | 12/1997 | |
| WO | WO-2012167861 | A1 * | 12/2012 | ........... F16K 17/048 |

OTHER PUBLICATIONS

Written Opinion of the ISA relating to International Application No. PCT/GB2015/053739, dated May 10, 2016.

* cited by examiner

FILLING DEVICE FOR A PRESSURISED HEATING CIRCUIT

CROSS-REFERENCE TO RELATED APPLICATION(S)

This application is a U.S. National Stage Patent Application of PCT International Patent Application Ser. No. PCT/GB2015/053739 (filed on Dec. 7, 2015) under 35 U.S.C. § 371, which claims priority to United Kingdom Patent Application Ser. No. GB1421737.6 (filed on Dec. 8, 2014), which are all hereby incorporated by reference herein in their entireties.

TECHNICAL FIELD

The present invention relates to filling devices for pressurised sealed central heating systems.

BACKGROUND

As illustrated in prior art FIGS. 1A and 1B a conventional pressurised heating systems includes a boiler or furnace 1 in line with heating circuit pipe 2. The boiler needs to be filled from a pressurised water source such as a mains water supply pipe 3. To do this the mains water supply pipe 3 may be provided with an inlet valve 4 attached by a compression fitting. The inlet valve may be a stop or isolation valve. One inlet end of a plain hose 5 is connected by means of a BSP threaded coupling to the inlet valve 4. The heating circuit pipe 2 is provided with a spur on to which an outlet valve 6 is mounted by a compression coupling. The outlet valve is preferably a stop or isolation valve. The outlet end of the hose 5 is then connected to the outlet valve 6 by a threaded coupling (step S1 in FIG. 1B).

To charge the heating circuit the valves 4 and 6 are then opened (step S1.2) and water is allowed to flow into the heating circuit until a pressure gauge 7 indicates a specified circuit pressure is reached (S1.3). A check valve may be provided, preferably in one or more of the isolation valves, to prevent leakage of water back out of the pressurised circuit.

When the circuit is charged according to the system specifications the valves 4 and 6 should be closed (S1.4) and the hose 5 removed (S1.5) to ensure that there is no connection between the heating circuit 2 and mains supply pipe 3. The filling hose 5 should be left in close proximity to the boiler 1 to provide for subsequent system charging.

It is a frequent occurrence that boilers are damaged by an inexperienced or careless user leaving the filling device (filling loop) in place and the valves 4, 6 open, so over pressurising the system or allowing mains water to circulate within the heating circuit. Water in the heating circuit in accordance with good practice should be treated with anti-oxidising and anti-scaling agents. If the filling device is left in place untreated water circulates in the heating system accelerating corrosion and causing rapid and severe scaling with consequent premature failure of the boiler. Experience shows that the boiler failures can be sufficiently severe to require total replacement of the boiler.

The applicant perceives a demand for a filling device which may be able to:

reduce system installation and charging time by obviating the need to fit and remove the hose, and in many practical cases to replace or find the hose which is often lost.

ensure that the mains water supply will be isolated from the heating circuit after charging however inexperienced or careless the operator is.

ensure that the specified charging pressure is delivered on every charge.

reliably and safely be operated by an unqualified operative such as the end user.

PRIOR ART

The prior art devices to prevent this situation are complex devices which admit water into the heating circuit on a periodic basis to maintain the pressure.

GB2450086 discloses an apparatus for controlling the pressure of a heating fluid within a central heating system or for controlling the flow of heating fluid into a central heating system. The apparatus comprises an inlet, for connection to a supply of heating fluid, and an outlet, for connection to a heating system. A pressure sensor is arranged to sense the heating fluid pressure within the central heating system. A flow sensor is arranged to sense the volume of heating fluid flowing between the inlet and the outlet. A flow control valve controls the flow of heating fluid from the inlet to the outlet. The flow control valve is operatively connected to the pressure sensor and is arranged to open when the sensed pressure falls below a first predetermined pressure and close when the sensed pressure rises above a second predetermined pressure. Alternatively, the flow control valve is operatively connected to the flow sensor and is arranged to close once a predetermined volume of heating fluid has flowed. A self-bleeding radiator valve comprising a filter arranged to inhibit particulate matter from interfering with the operation of the valve is disclosed. A filtration device for a central heating system, preferably comprising a magnetic particle filter, is also disclosed.

This prior art device of GB2450086 provides a complex solution to the problem, comprising a pressure and/or flow sensor to control filling of the heating system by electronic means. As such it is over-complicated and costly for standard domestic use.

US20060124078 discloses a water feed controller which can provide for the addition of a preset fixed amount of water to be added after a low water condition is removed. This system provides for a preset fixed amount of water to be added to a boiler above the amount which triggers the low water condition. This generally inhibits excess cycling from the boiler operating at its minimum safe water level as well as inhibiting overfilling of the boiler. Further, there is discussed a water feed controller which can measure the amount of water added over a prior predetermined period (such as 30 days) which serves as a floating window of time so that a leak or other condition resulting in overly frequent filling can be detected quickly.

US20060124078 discloses: A water feed controller for a boiler, the controller comprising: electronics for monitoring the signal from a low water cut-off (LWCO); electronics for opening and closing a water path; and a processor; wherein when said electronics for monitoring detect a low water signal from said LWCO, said processor initiates opening of said water path to allow water to flow into said boiler; wherein said water path remains open until said LWCO ceases signalling a low water condition; and wherein said processor allows said water path to remain open after said LWCO ceases signalling said low water condition, so a preset fixed amount of water is added into said boiler after said LWCO ceases signalling said low water condition.

Again, these are complex electronic devices, over-specified for standard domestic use and not useful or easy to retrofit to existing boiler installations.

GB2204669 discloses: A fluid source e.g. a mains water supply is connected to a fluid user system such as a combination boiler by means including a non-return valve unit, a flow regulator and pipework for connecting the valve unit and flow regulator. The non return valve allows fluid flow to the fluid user system but prevents reverse fluid flow from the user system to the fluid source. The check valve unit may have an outlet portion permanently connected to the boiler and a conical inlet passage in which a flexible pipe may be held manually during top-up of the boiler. The unit may include two identical valve stems. This device is a standard filling loop device, without a fail-safe mechanism.

STATEMENT OF INVENTION

According to the present invention there is provided a filling device for a pressurised heating system comprising: means defining a fluid passage having, an inlet port connectable to a fluid supply and an outlet port connectable to a heating system fluid circuit; and a dead-man valve interposed in the passage between the inlet port and the outlet port, said dead-man valve biased to a normally closed condition to shut off fluid flow through the channel in either direction when unattended, and manually operable to an open condition to permit fluid to flow from the inlet port to the outlet port.

The fluid passage may be provided by a length of pipe, flexible hose or via a channel in a mono-block. The inlet and outlet ports may be provided by any conventional coupling including at least: threaded BSP and compression couplings.

The dead-man valve is a valve which is biased to the closed condition and manually operable by an actuator to switch to the open condition. Consequently on releasing the actuator the valve closes. Therefore the valve cannot be left unattended in an open condition. A preferred version of the dead-man valve has a pushbutton actuator biased by a spring to the closed condition. The button must be held in the depressed condition to enable fluid to flow through the push button valve.

A push button valve may be vulnerable to jamming open by abusive users, for example by wrapping with tape, consequently actuators such as a spring biased twist grip or other less easily jammed configurations may be preferred.

To ensure there is no backflow from the boiler circuit to the mains water, a one way or check valve is connected such that flow from the inlet to the outlet connector is allowed while the reverse flow is prevented. Single check valves may be vulnerable to reverse flow leakage to prevent which a double check valve may be provided.

A second isolation valve may be connected to the check valve.

A check valve and an isolation valve may be provided in the same housing.

In some embodiments the device comprises, connected in order along the flow pathway: a 15 mm inlet compression to 8 mm ball valve, an 8 mm push button water valve, a 15 mm to 8 mm adapter, a 15 mm flexible filling link comprising a metal braided hose and a 15 mm double check ball valve.

In this way the device provides a means to fill a pressurised heating circuit from a pressurised water source such as a mains water supply, the device being connectable in place of a standard filling loop as known in the art. The use of the push button valve in the fluid pathway means that it is impossible to leave the filling loop in place and open, so avoiding accidental damage to the heating boiler.

It will be understood that the flexible tubing portion may have a range of lengths to suit the configuration of the boiler installation, and that the connector types are not limited to any specific size and the device may be produced with chosen connector sizes to suit the installation.

The device can also include a pressure regulator pre-set to deliver fluid to the outlet at a pressure compatible with the operation of the boiler. This facilitates use by non-technical untrained or sight disabled users who may misread the pressure gauge and charge the heating system to excessive or inadequate pressure.

BRIEF DESCRIPTION

Embodiments of a filling device for a pressurised heating circuit constructed in accordance with the present invention, will now be described, by way of example only, with reference to the accompanying illustrative drawings, in which.

DETAILED DESCRIPTION OF FIGURES

Figure 1A:
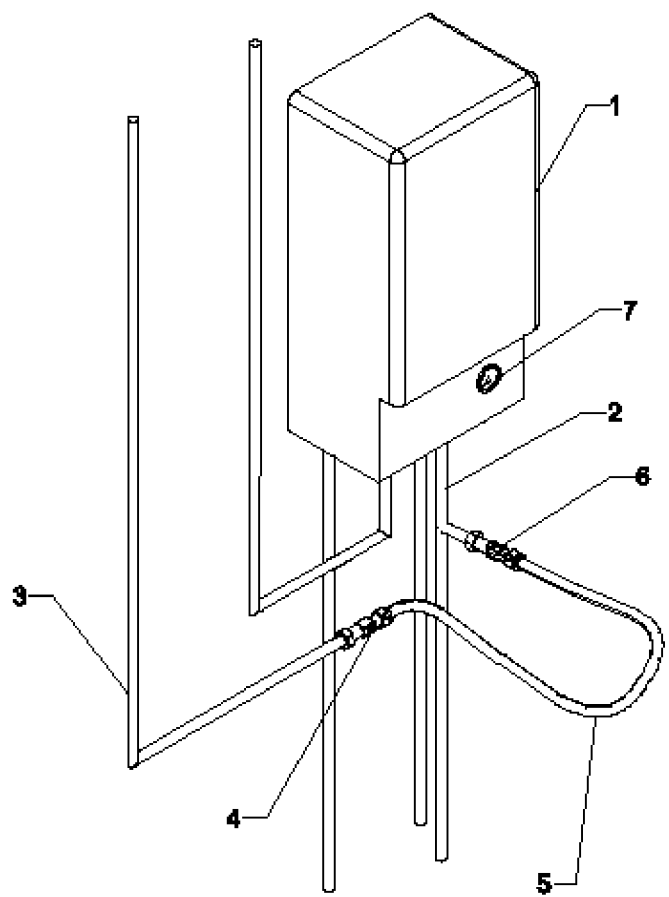
FIGS. 1A and 1B illustrate conventional pressurized heating systems including a boiler or furnace in line with a heating circuit pipe.
Figure 1B:
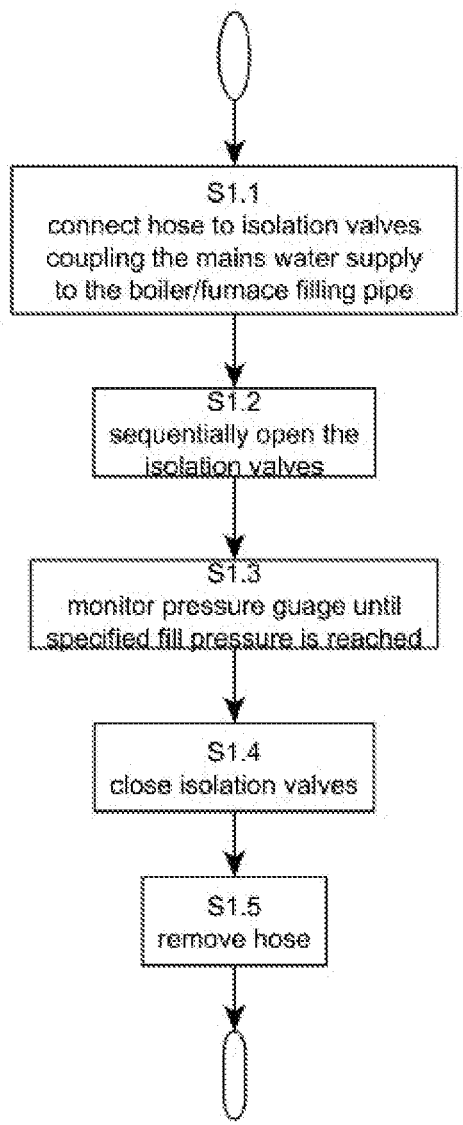
Figure 2A:
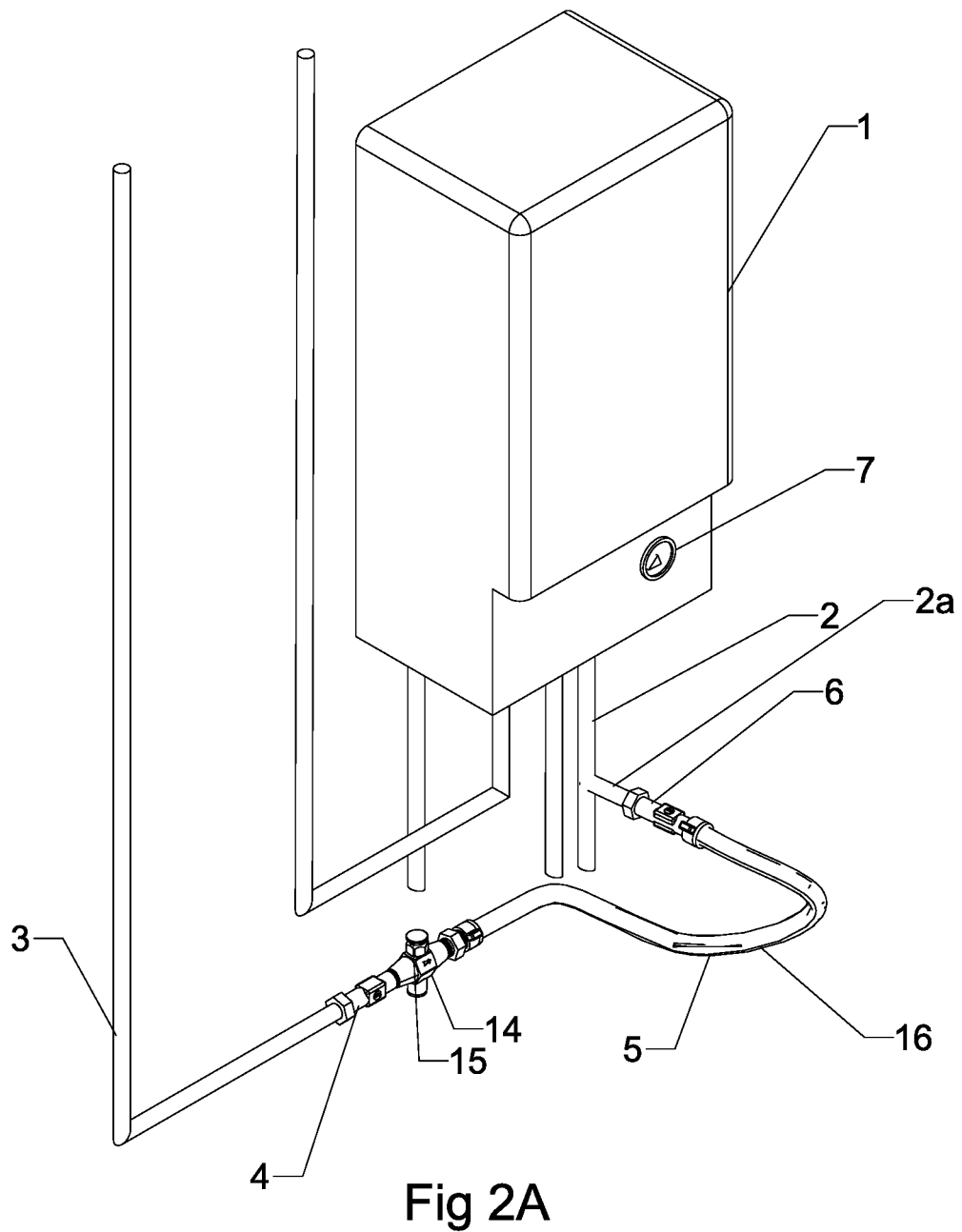
FIG. 2A shows a SW isometric view of a first embodiment of the device installed in a part of a pressurised heating circuit including a boiler.
Figure 2B:
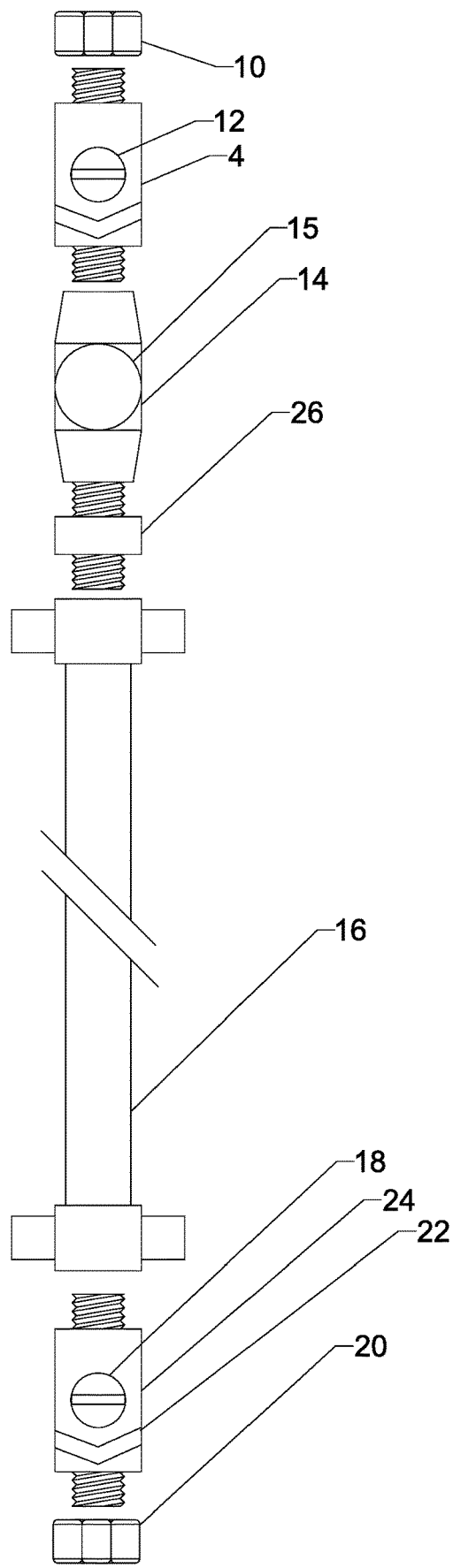
FIG. 2B is an exploded plan view of the filling device of FIG. 2A.

Features common to the prior art of FIG. 1 are referenced with the same numerals. Thus FIG. 2A shows a boiler or furnace 1 plumbed into a heating circuit to circulate hot water through a pressurised heating circuit pipe 2.

An inlet valve 4 is coupled to a terminus of the mains water pipe 3 by means of an inlet connector 10. In this case the inlet connector 10 is a conventional compression coupling; however other known forms of coupling including press fit, cement or solder may be employed. The coupling 10 couples an isolation valve 12 to the end of the mains water pipe 3.

A dead man valve is provided by a push button valve 14 configured to open the fluid flow pathway when the push button 15 is pushed and thereby displaces a spool against a bias to open a passage through the valve. When the button is released the bias displaces the spool and button to close the fluid passage. In the embodiment shown the push button valve 14 has an upstream port adapted to be coupled to a downstream port of the isolation valve 12 by means of a BSP threaded coupling.

A downstream port 14*d* of the push button valve 14 is coupled to a flexible tubing portion (hose) 16 to provide fluid communication with the outlet valve 6. The outlet valve 6 has a housing 24 and includes an isolation valve 18 which includes a check valve 22, connected such that flow from the inlet 4 to the outlet valve is allowed while reverse flow is prevented. The outlet valve 6 is coupled to a spur off the heating circuit pipe by means of a compression coupling outlet connector 20. In some embodiments the check valve in the outlet valve 6 is a double check valve to add reliability.

Figure 2C:
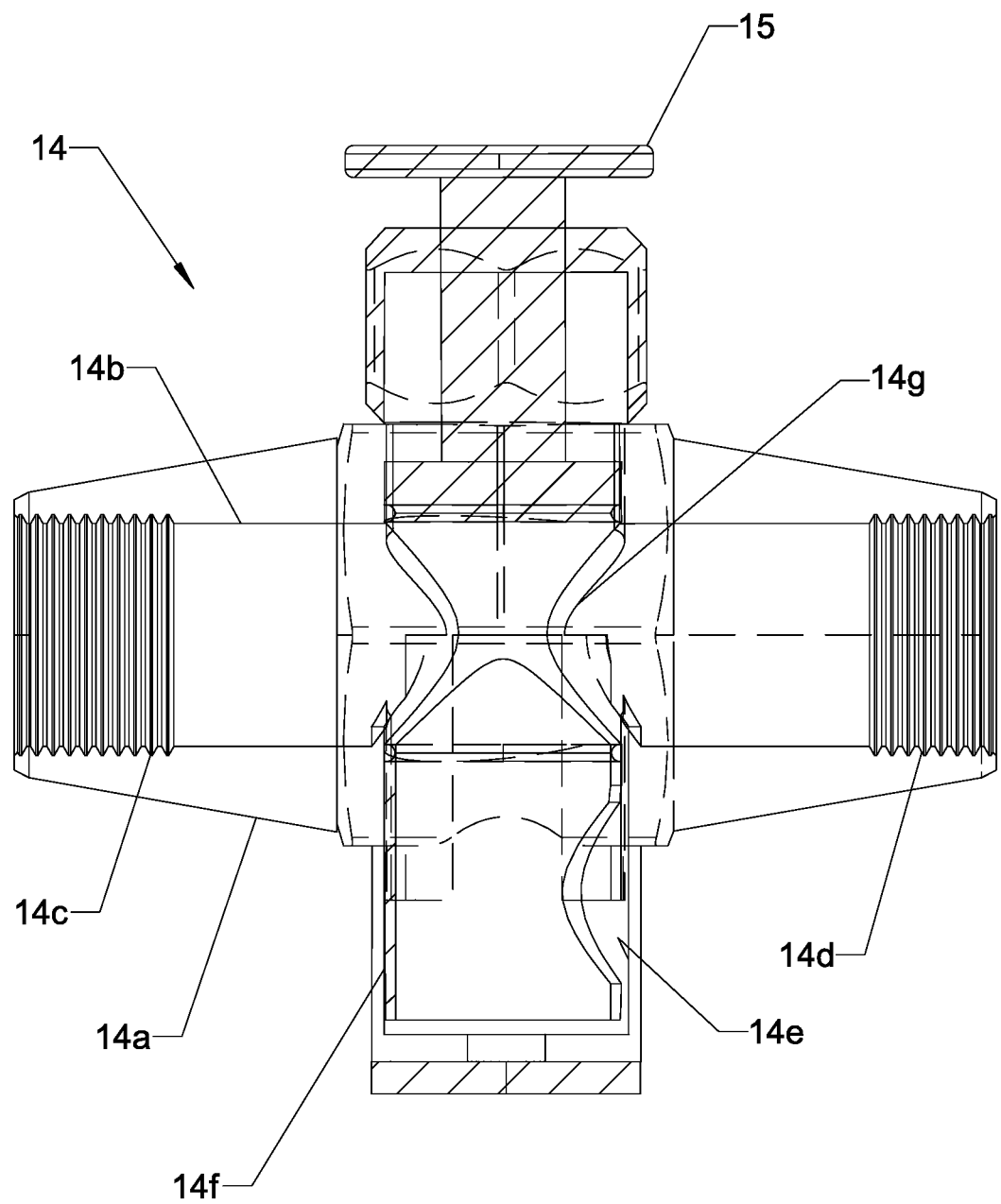
FIG. 2C is a sectional detail of a first variant of a dead-man valve used in the first embodiment.

FIG. 2C shows a sectional detail of the push button valve 14 with the button depressed. The push button valve 14 has a casing 14*a* with a fluid through passage 14*b* communicating a female threaded inlet port 14*c* and outlet port 14*d*. The passage 14*b* is intersected by a spool chamber 14*e* containing a spool 14*f*. The spool 14*f* is in this case cylindrical. Anti-rotating means (not shown) may be provided to prevent the spool from rotating around its axis. Such means may include a tongued washer, located in nut 15*a* and engaging a groove in the stem 15*b* of the push button.

Figure 3A:
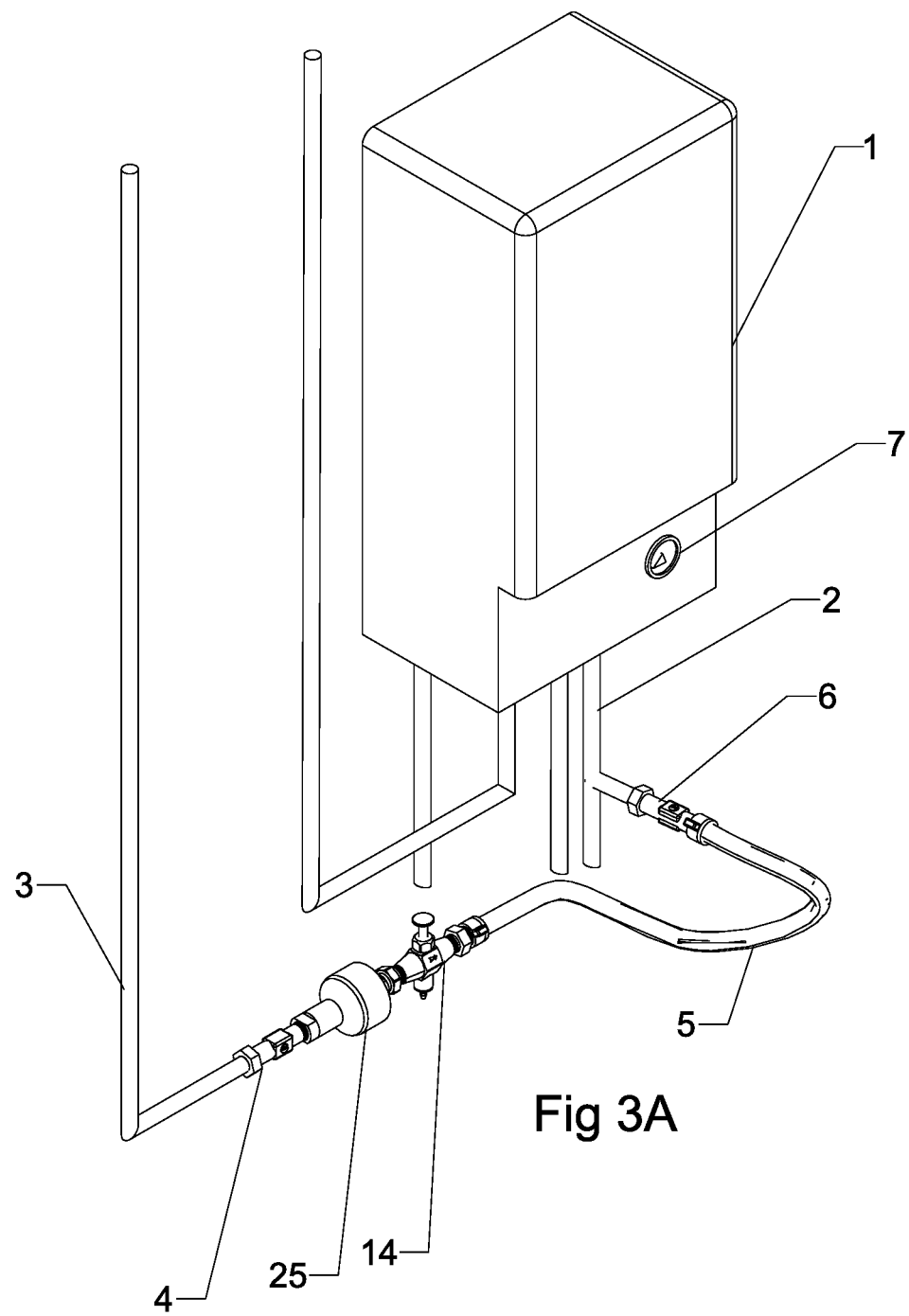
FIG. 3A is a SW isometric view of a second embodiment of the device installed in a part of a pressurised heating circuit including a boiler.
Figure 3B:
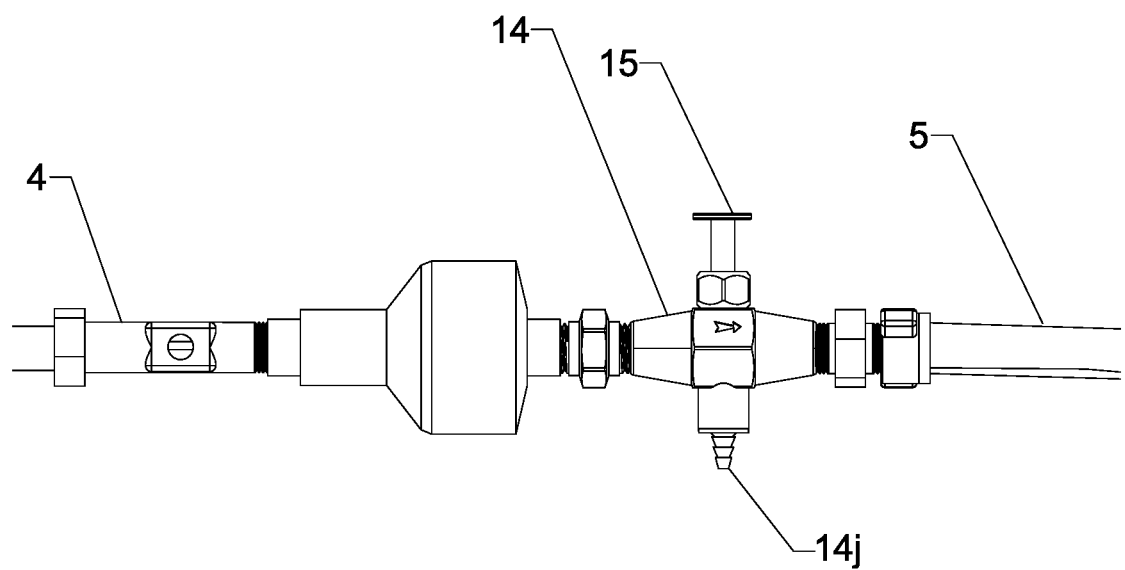
FIG. 3B is an enlarged detail side elevation of the filling device of the second embodiment.
Figure 3C:
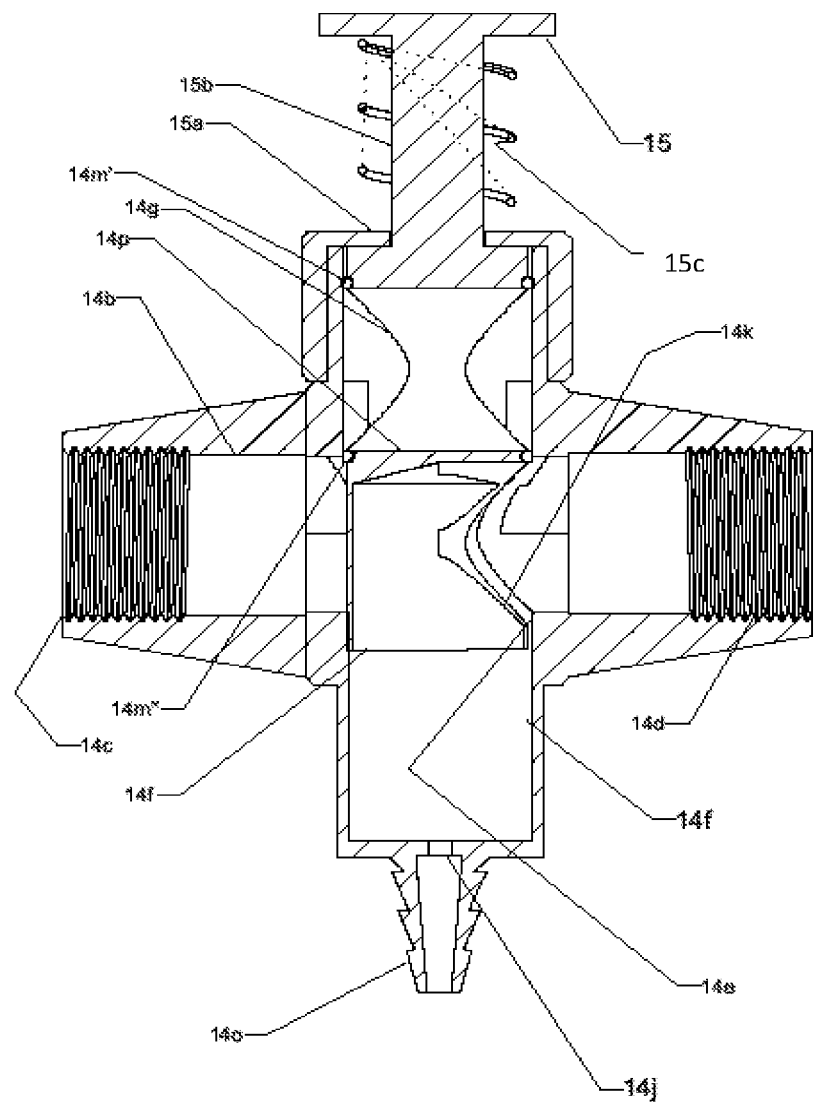
FIG. 3C is a further enlarged sectional elevation through the dead-man valve of the second embodiment.
Figure 3D:
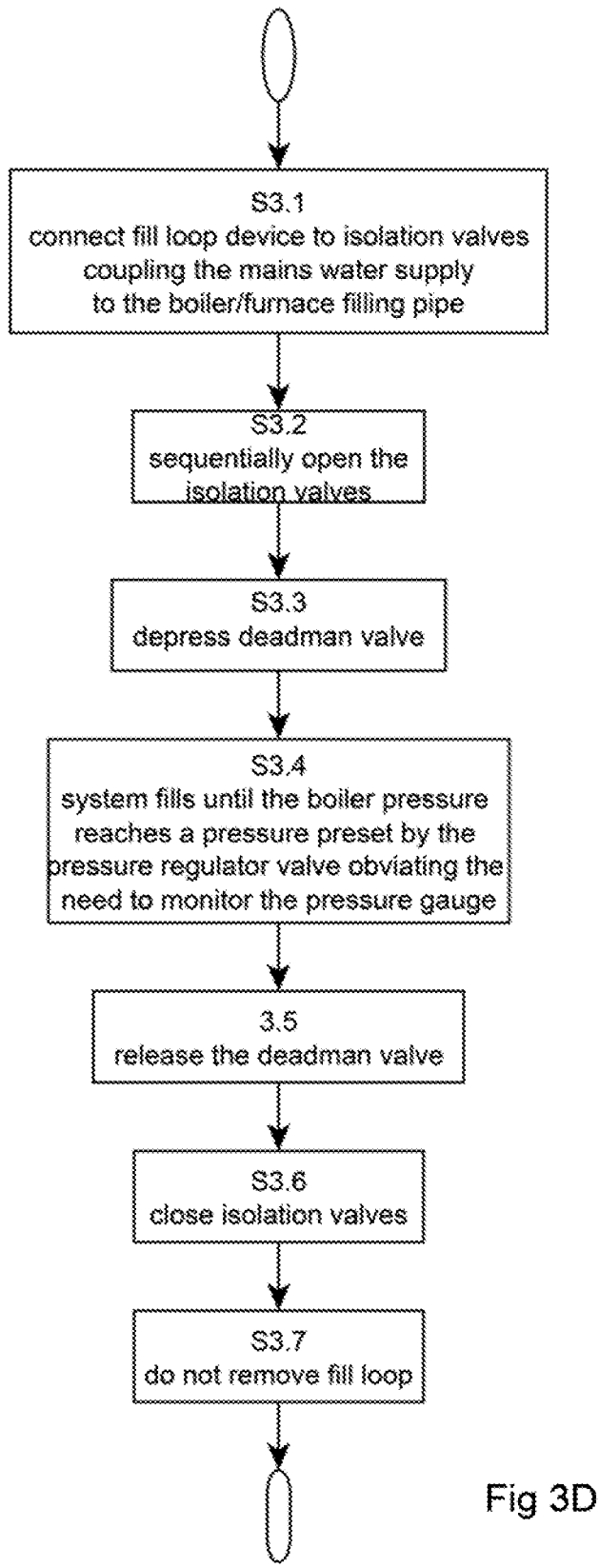
FIG. 3D is a flowchart of the process of using the second embodiment.

The anti-rotating means ensures that a through passage 14*g* extending diametrically through the spool 14*f* is aligned with the passage 14*b* to facilitate the passage of water through the valve when the pushbutton is depressed. A compression spring 15*c* is arranged to urge the spool 14*f* up into a condition where a lower part 14*l* of the spool obstructs the passage 14*b* as can be seen in FIG. 3C.

Figure 2D:
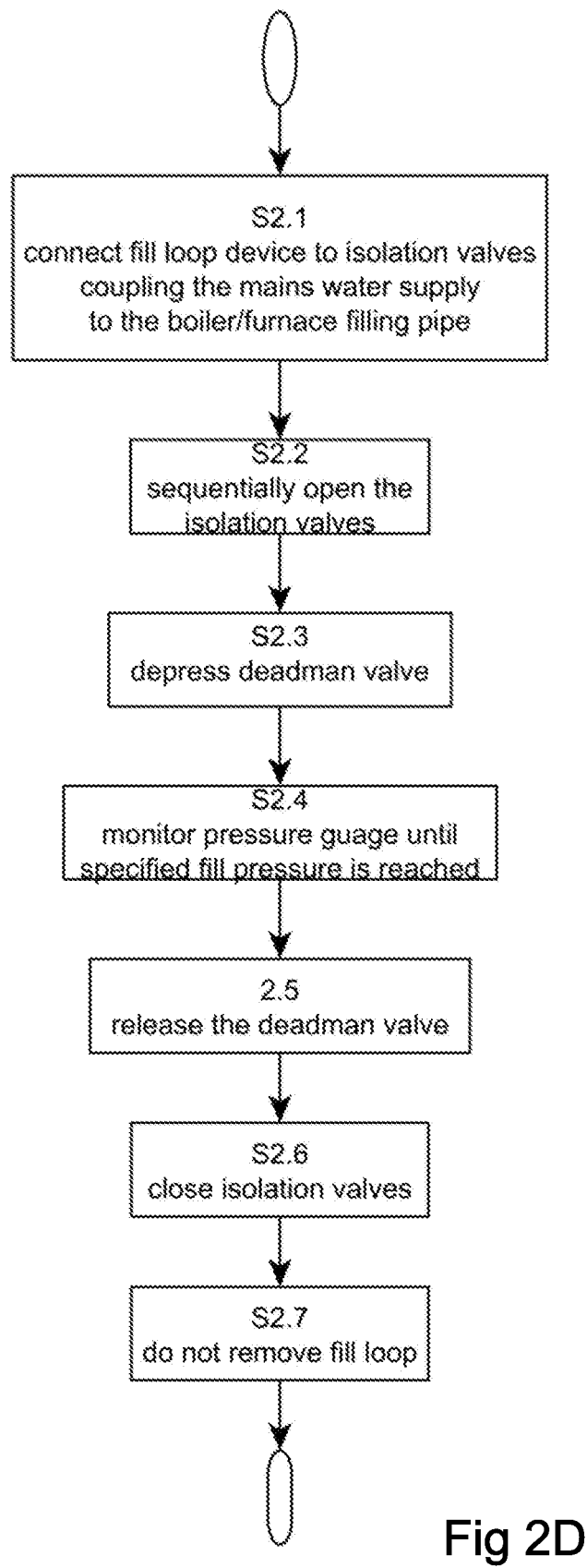
FIG. 2D is a flow chart showing the new process for using the first embodiment.

An "O" ring 14*m'* encircles the spool above the upper part, a middle "O" ring 14*m"* encircles the spool between the upper and lower part and a lower "O" ring encircles the spool at the bottom of the lower part. The "O" rings provide a fluid sealing bearing surface for the spool in the cylindrical spool chamber. FIG. 2D is a flow chart showing the method of using the device of the first embodiment. The inlet valve 4 and outlet valve 6 will be installed with the heating system and will remain in place on the mains supply 3 and heating circuit spur 2*a* as in the conventional prior art arrangement.

In step 2.1 the fill loop device is coupled between the inlet and outlet valves 4 and 6 to provide a channel for the passage of mains water. At step 2.2 the isolation valves 12 and 18 are opened. At step 2.3 the press button of the dead-man valve is depressed thereby opening a passage for the flow of mains water from the mains pipe 3 to the heating circuit spur 2*a*. This pressurises the heating circuit 2 and the pressure is read at step 2.4 from the pressure gauge 7 by the user until a manufacturer specified pressure is reached. When the specified pressure is reached the press button valve is released at step 2.5. The isolation valves 12 and 18 should then be closed at step 2.6. Conveniently the filling loop may then be left in place at step S2.7 since there is no possibility of water flow through the filling loop device so long as the valves function correctly. Even if step 2.6 is overlooked there is little risk of water flow into the heating circuit and less of water flow from the heating circuit into the mains supply. In this first embodiment the device comprises, connected in order along the flow pathway: a 15 mm inlet compression to 8 mm ball valve 12, an 8 mm push button water valve 14, a 15 mm to 8 mm adapter 26, a 15 mm flexible filling link comprising a metal braided hose 16 and a 15 mm combined double check and ball valve 24.

The second embodiment of the fill loop device is generally similar to the first and corresponding components are identified with similar numerals. Accordingly only the differences will be described. As can best be seen in FIGS. 3A and 3B the filling loop device includes a governor or pressure regulating valve 25 in series with the press button valve 14. The pressure regulating valve 25 is set to limit the maximum water supply pressure at the outlet 6 of the filling loop device to correspond to the specified maximum pressure for the boiler 1. As a result an inexperienced or untrained user cannot over pressurise the system and thereby cause damage.

A further modification of the second embodiment is most readily apparent from FIG. 3C. This addresses the issue of the isolation valve 18 being incorrectly left open and permitting backflow to the press valve 14 even against the check valve 22. Against this eventuality a drain passage 14*k* is formed in the lower part of the spool and arranged to align with the outlet port. The drain passage 14*k* is isolated from the through passage by a barrier 14*p*, and the middle "O" ring 14*m"*. The drain passage communicates with a lower part of the spool chamber and hence to a drain port 14*j* is provided in the body of the press valve 14. The drain port is conveniently formed by drilling a bore 14*m* through the base 14*n* of the spool chamber. Since the lower part of the spool chamber is then open to air this creates an air gap between the inlet port and the outlet port. A hollow nipple 14*o* may be formed on the spool chamber base in communication with the bore 14*m* to which a hose may be attached. This allows water flowing back into the press valve (from the right in FIG. 3C, to flow through a drain port 14*k* formed in a bottom portion of the spool 14*f* and to drain out through the drain port 14*j*.

FIG. 3C illustrates an embodiment in which a spring 15*c*, is located around the press button stem to act between the press button and the valve nut 15*b*, instead of being located in the spool chamber to act between the spool and the casing.

Figure 4A:
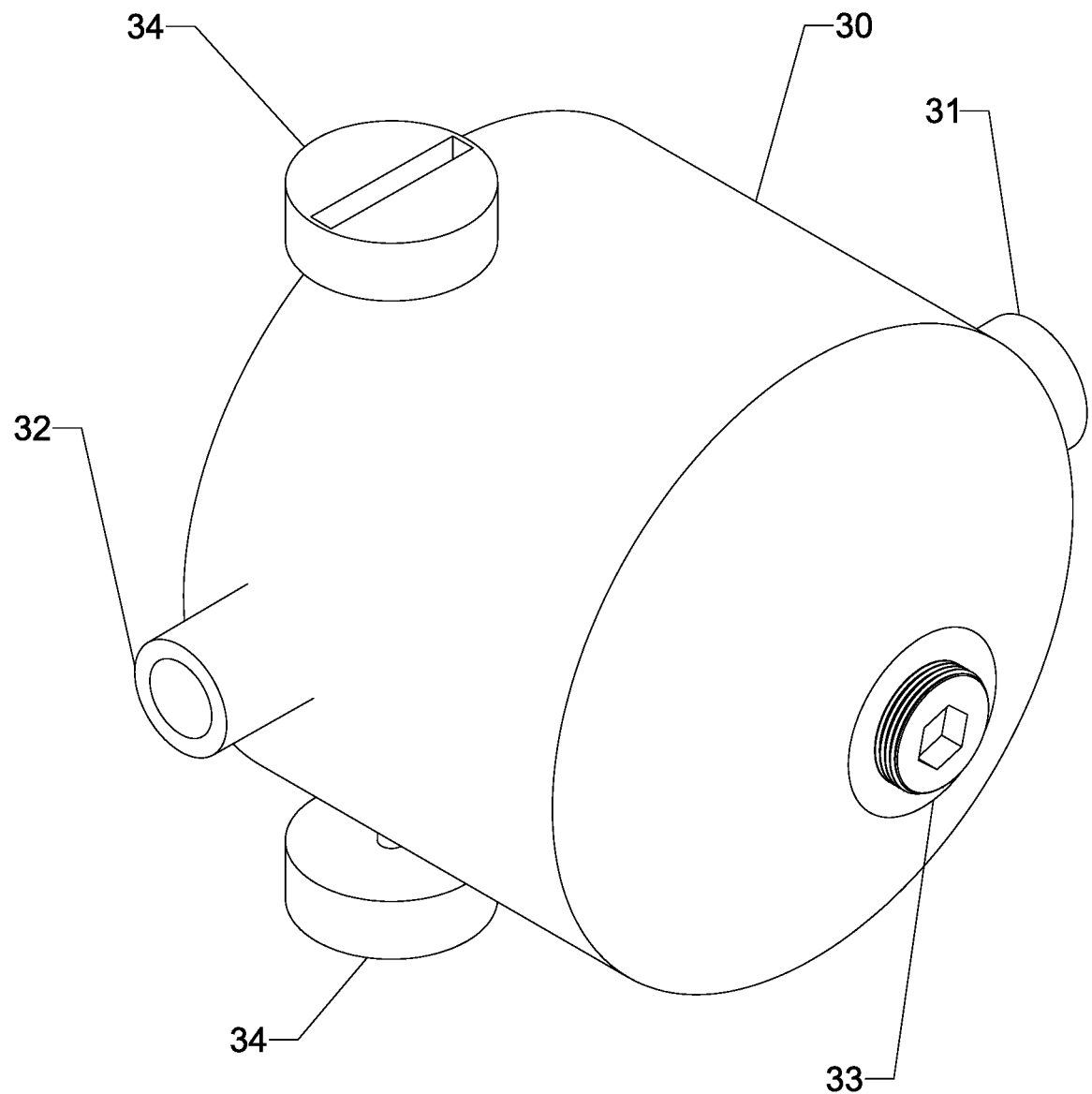
FIG. 4A shows an isometric view of a third embodiment of the invention wherein a dead-man valve is integrated with a regulator valve.
Figure 4B:
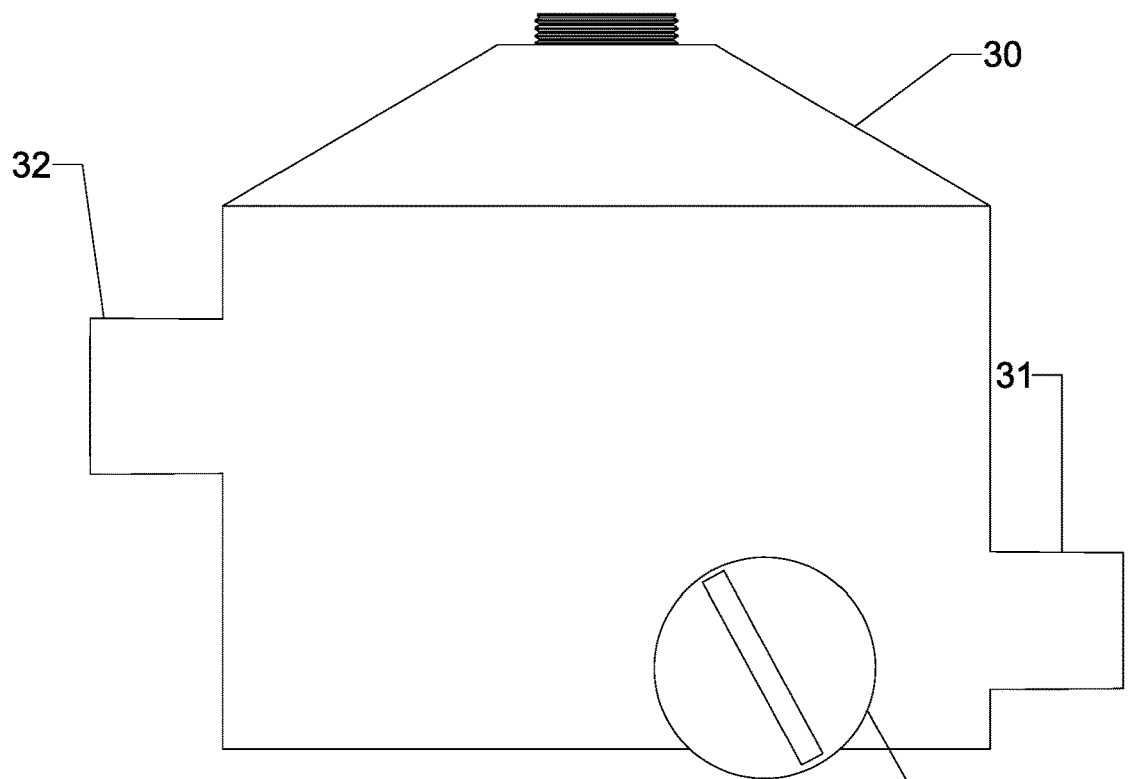
FIG. 4B shows a plan vie of the third embodiment in a closed condition.

Referring to FIG. 4A the dead-man valve and pressure regulator valve are combined in a single unitary structure 30 which has an inlet port 31 and outlet port 32. The inlet port 31 may be directly connected to the mains water supply 3, preferably via an isolation check valve such as 4 in the previous embodiments, similarly the outlet port 32 can be directly connected to the heating circuit via the an isolation check valve such as previously described at 6. The regulator valve 30 has a pressure set screw 33 to set the maximum pass pressure for the valve and will commonly be pre-set according to the manufacturers specifications for the heating system. The press button of the previous embodiments is replaced by a rotatable knob 34.

Figure 4C:
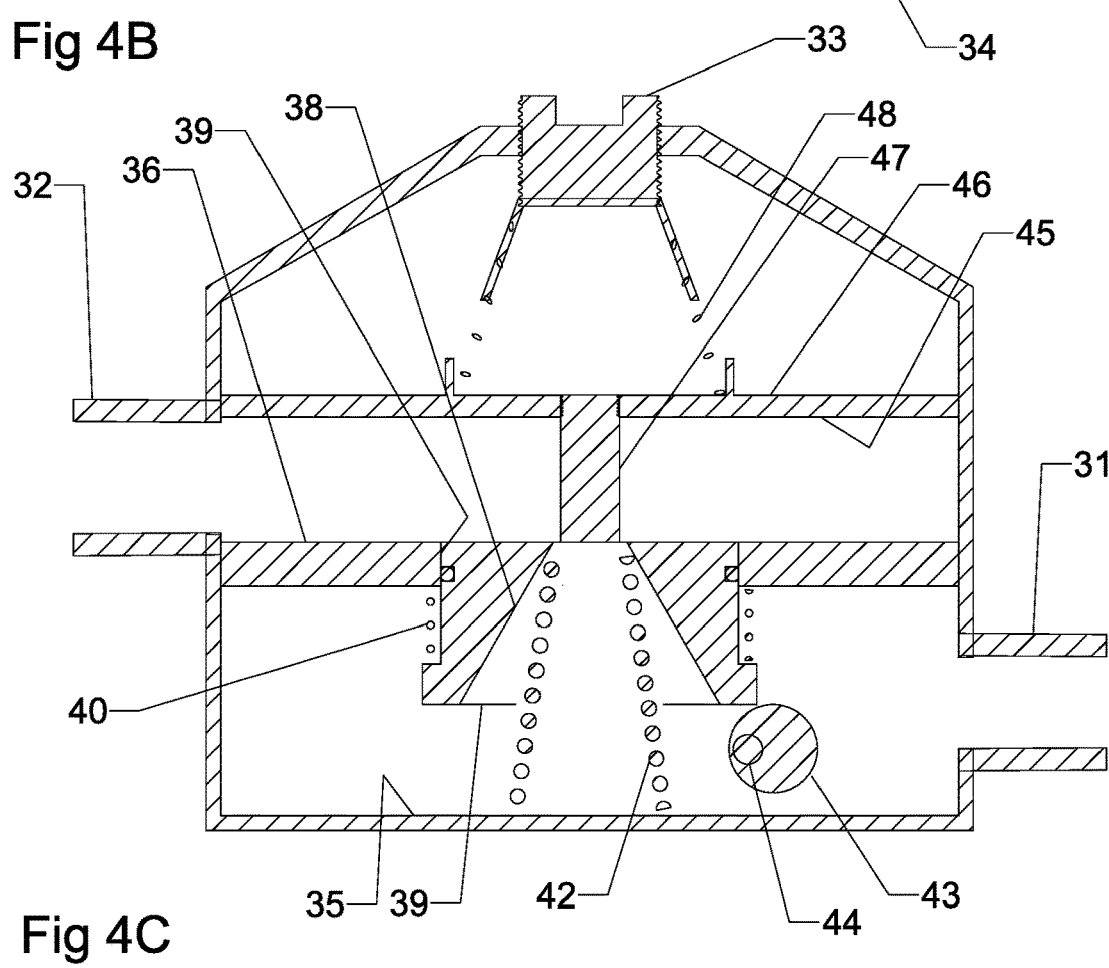
FIG. 4C shows a sectional plan view through FIG. 4B.

The inlet port 31 communicates with a first chamber 35. This is closed by an annular bulkhead 36. The lumen 37 of the bulkhead 36 is closed by a piston valve seat 38 which can move in the vertical axial direction of the figures. Fluid sealing is achieved via an O ring seal 39, and the piston valve seat 38 is normally urged towards a closed and sealed condition, as shown in FIG. 4C by the action of a piston valve seat coil spring 40 which acts between the piston valve seat and bulkhead. This action presses the piston valve seat to sealingly engage a poppet or needle valve 41.

The poppet valve 41 is in turn urged up to engage the piston valve seat 38 by the action of a poppet valve compression spring 42 acting between the valve casing and the poppet valve 41. A cam 43 is mounted on a shaft 44 which is sealingly journaled to extend through the casing to irottatably engage rotary knob 34. The cam 43 may be constrained to rotate no more than the positions illustrated in order to retain the piston valve seat 38 against the action of the piston valve seat spring 40. Thus in the stopped condition shown in FIG. 4c no water can flow from the inlet chamber 35 to an outlet chamber 45 above the bulkhead.

As with conventional regulator valves, the outlet chamber 45 is sealed by a piston 46 which is connected to the poppet valve 41 by a con-rod 47. The piston 47 is urged down into the outlet chamber by the action of a piston spring 48 preloaded by the set screw 33.

Figure 4D:
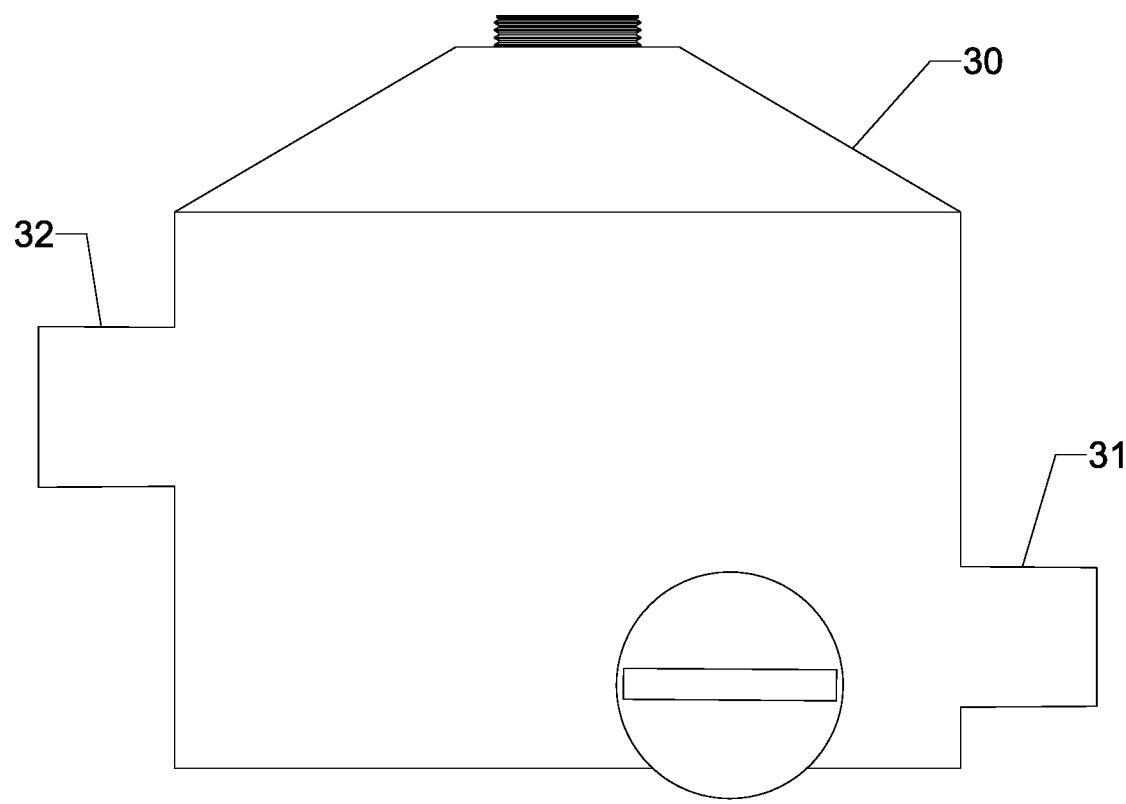
FIG. 4D shows a plan view of the third embodiment in the open condition for charging the heating circuit.
Figure 4E:
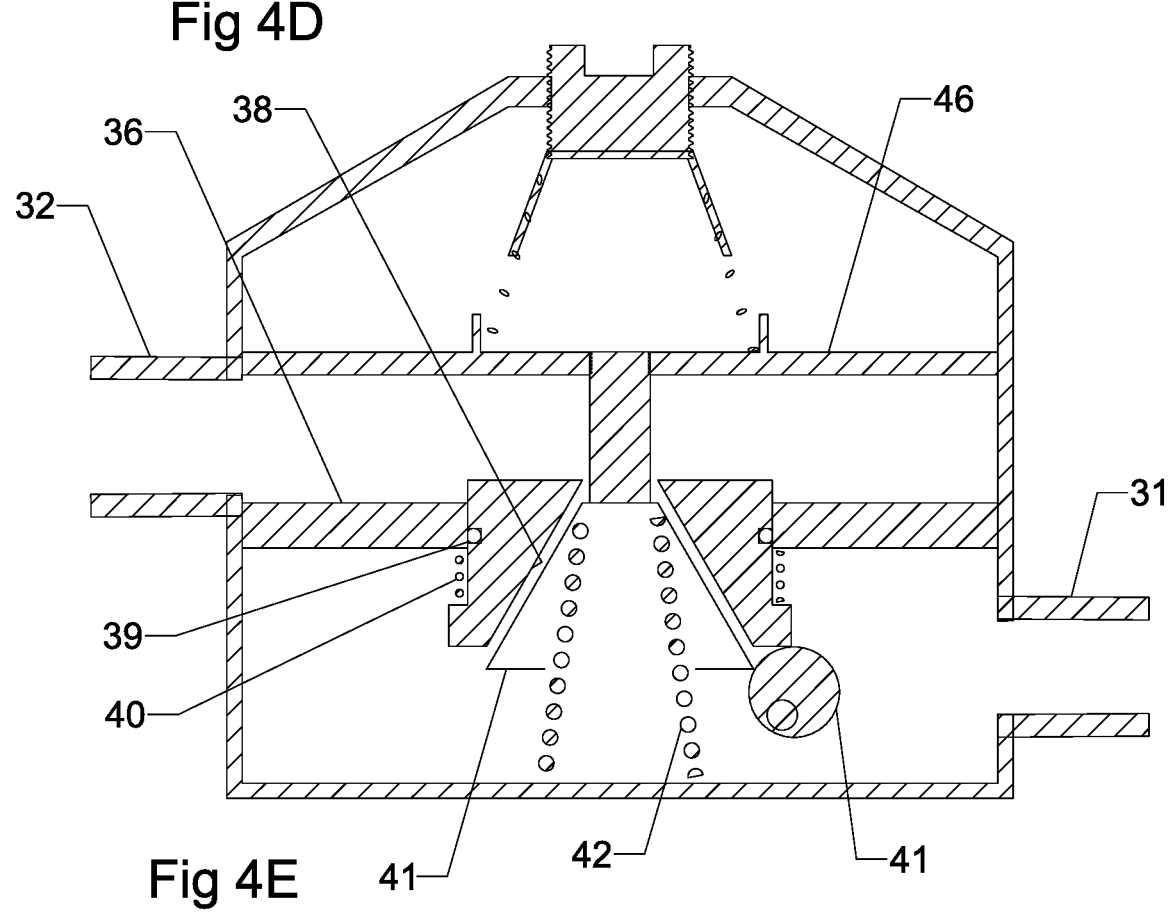
FIG. 4E shows a sectional plan view of FIG. 4D.

To charge the heating circuit or boiler the knob 34 is rotated to the position shown in FIG. 4D. This rotates the cam 41 to press the piston valve seat 38 up against the action of the spring 40. Water can now flow between the poppet valve 41 and the piston valve seat 38 into the outlet chamber 45 and so to the outlet 32.

If the pressure in the outlet chamber rises excessively the force applied to the piston 46 causes the piston 46 to rise carrying the poppet valve towards the piston valve seat 38 and causing the pressure in the outlet chamber 45 to drop. If the knob 34 is released the piston valve seat spring 40 presses the piston valve seat down against the cam 41. The rotary axis of the cam 41 is arranged offset such that this induces a moment arm which rotates the cam back towards the closed condition. Thus the dead-man regulator valve cannot be left open unattended.

In a further variant of third embodiment check valves may be installed in the inlet and/or outlets 31, 32.

The operation of the third embodiment is substantially similar to the operation of the second embodiment.

It will be appreciated by the skilled person that while the filling loop device has been developed mainly for retrofit to existing pressurised boiler heating installation, it may be integrated into a boiler housing at manufacture, especially in the case of the second or third embodiments.

It will be understood that any features described in relation to any one embodiment may where reasonable, be technically feasible, be combined with any other described embodiments.

The invention may be further defined by the following clauses:

A filling device for a pressurised heating circuit comprising the following components connected in series to define a fluid flow path through them:
  an inlet connector,
  an inlet isolation valve,
  a push button valve configured to open the fluid flow pathway when the button is pushed and to close it when the button is released,
  a flexible tubing portion,
  a check valve, connected such that flow from the inlet connector to an outlet connector is allowed while the reverse flow is prevented, and an outlet connector.

A device according to the immediately preceding paragraph wherein the check valve is a double check valve.

A device according to either of the two immediately preceding paragraphs comprising a second isolation valve connected to the check valve.

A device according to any one of the three preceding paragraphs wherein a check valve and an isolation valve are provided in the same housing.

The invention claimed is:

1. A filling loop device for a pressurized heating system comprising:
  a casing having an inlet port connected by a fluid passage to an outlet port, said inlet port connectable to a fluid supply and said outlet port connectable to a heating system fluid circuit;
  a spool chamber interrupting said fluid passage, a spool slidably housed in the spool chamber, said spool including a through passage capable of communicating the inlet port and outlet port for fluid flow there between, and a drain passage capable of communicating the outlet port and a drain port formed in a lower part of the spool chamber, said drain port for discharge to a drain at ambient pressure, wherein water passing into either of the through passage or the drain passage cannot pass into the other of the passages;
  bias means to urge the spool so that the drain passage communicates the outlet port and the drain port and closes the inlet port; and
  an actuator operable to overcome the bias, whereby the filling loop device acts as a deadman valve and a fluid supply break ensuring that the pressurized heating circuit is normally isolated from the supply, and fluid in the heating circuit is normally isolated from the supply, and fluid in the heating circuit cannot leak back into the supply.

2. A device according to claim 1 comprising a pressure regulator valve pre-set to prevent excess pressurisation of a heating system.

3. A device according to claim 1 wherein the bias means comprises a spring to bias the spool to close a fluid passage through the valve and a manual actuator operable to displace the spool in opposition to the spring force while manually attended.

4. A device according to claim 3 wherein the actuator comprises a press button.

5. A device according to claim 1 wherein the drain port is formed in a base of the spool chamber.

6. A device according to claim 1 wherein the drain port is provided with a hose coupling.

7. A device according to claim 6 wherein the hose coupling is a nipple.

* * * * *